United States Patent
Brechon

(10) Patent No.: US 11,596,098 B2
(45) Date of Patent: Mar. 7, 2023

(54) SYSTEM, APPARATUS AND METHOD FOR APPLYING UAN LIQUID FERTILIZER TO THE SOIL

(71) Applicant: Gerald A. Brechon, Dixon, IL (US)

(72) Inventor: Gerald A. Brechon, Dixon, IL (US)

(73) Assignee: Ag Automation, Inc., Dixon, IL (US)

( * ) Notice: Subject to any disclaimer, the term of this patent is extended or adjusted under 35 U.S.C. 154(b) by 1054 days.

(21) Appl. No.: 15/895,772

(22) Filed: Feb. 13, 2018

(65) Prior Publication Data
US 2018/0228079 A1 Aug. 16, 2018

Related U.S. Application Data

(60) Provisional application No. 62/459,479, filed on Feb. 15, 2017.

(51) Int. Cl.
*A01C 23/04* (2006.01)
*A01M 7/00* (2006.01)
(Continued)

(52) U.S. Cl.
CPC ......... *A01C 23/047* (2013.01); *A01M 7/0075* (2013.01); *A01M 7/0082* (2013.01);
(Continued)

(58) Field of Classification Search
CPC ... A01C 23/047; A01C 23/005; A01C 23/024; A01M 7/0075; A01M 7/0082; A01M 7/0089
(Continued)

(56) References Cited

U.S. PATENT DOCUMENTS 3,339,843 A * 9/1967 Horton ................ F04B 43/1253
239/157
4,458,609 A 7/1984 Tofte
(Continued)

FOREIGN PATENT DOCUMENTS

EP 1844639 A1 10/2007
EP 3072376 A2 9/2016
(Continued)

OTHER PUBLICATIONS

U.S. Appl. No. 15/818,516, filed Nov. 20, 2017, Brechon.

*Primary Examiner* — Christopher S Kim
(74) *Attorney, Agent, or Firm* — Reinhart Boerner Van Deuren P.C.

(57) ABSTRACT

A system, an apparatus and a method for uniformly applying UAN fertilizing liquid to soil on farmland for the purpose of increasing crop yields. The system has an UAN sprayer distribution rail applicator apparatus which may be pulled behind a tow vehicle or pushed by a sprayer or fertilizer applicator. The atmospheric tank contains UAN fertilizing liquid which passes from a pump, through a safety shut-off valve, and through a turbine style flow meter. A safety bypass line is provided upstream of the flow meter to relieve unsafe hydraulic pressure back through a pressure-sensitive valve in the event that multiple control valves close simultaneously. Flow through this bypass line also provides mixing of the UAN fertilizing liquid during cold weather. Upon exiting the flow meter, the UAN fluid enters the center of a distribution rail assembly. Spray nozzles with individual automatic shut-off valves are spaced across the distribution rail assembly.

20 Claims, 6 Drawing Sheets

(51) Int. Cl.
  *A01C 23/00* (2006.01)
  *A01C 23/02* (2006.01)
(52) U.S. Cl.
  CPC ......... *A01M 7/0089* (2013.01); *A01C 23/005* (2013.01); *A01C 23/024* (2013.01)
(58) Field of Classification Search
  USPC ....... 239/159, 161, 163, 166, 167, 168, 169, 239/170
  See application file for complete search history.

(56) References Cited

U.S. PATENT DOCUMENTS

| | | | |
|---|---|---|---|
| 4,735,365 A | * | 4/1988 | Smeller ................ A01G 25/092 239/735 |
| 4,949,656 A | | 8/1990 | Lyle et al. |
| 4,960,242 A | * | 10/1990 | Larson .................. E01C 19/176 239/168 |
| 5,598,708 A | | 2/1997 | Clark |
| 5,845,592 A | | 12/1998 | Ridgley |
| 6,269,757 B1 | | 8/2001 | Kiest |
| 6,283,049 B1 | | 9/2001 | Swanson |
| 6,360,681 B2 | | 3/2002 | Swanson |
| 9,043,949 B2 | | 6/2015 | Liu et al. |
| 9,232,690 B2 | | 1/2016 | Kowalchuk |
| 9,757,744 B2 | | 9/2017 | Truan et al. |
| 9,907,224 B2 | | 3/2018 | Rosengren et al. |
| 10,028,430 B2 | | 7/2018 | Henry et al. |
| 10,271,474 B1 | | 4/2019 | Miller et al. |
| 10,377,054 B2 | | 8/2019 | Borgmann et al. |
| 10,444,048 B2 | | 10/2019 | Humpal et al. |
| 10,576,202 B2 | | 3/2020 | Sims et al. |
| 10,577,901 B2 | | 3/2020 | Mineo et al. |
| 10,584,828 B2 | | 3/2020 | Brooks et al. |
| 10,584,873 B1 | | 3/2020 | Bacon |
| 2007/0227418 A1 | | 10/2007 | Polfer |
| 2010/0101466 A1 | | 4/2010 | Riewerts et al. |
| 2014/0263708 A1 | | 9/2014 | Thompson et al. |
| 2014/0277780 A1 | | 9/2014 | Jensen et al. |
| 2016/0044862 A1 | | 2/2016 | Kocer |
| 2016/0066500 A1 | | 3/2016 | Bruns et al. |

FOREIGN PATENT DOCUMENTS

| | | |
|---|---|---|
| KR | 20-0392369 Y1 | 8/2005 |
| KR | 10-0958580 B1 | 5/2010 |
| WO | WO 2015/077452 A1 | 5/2015 |

* cited by examiner

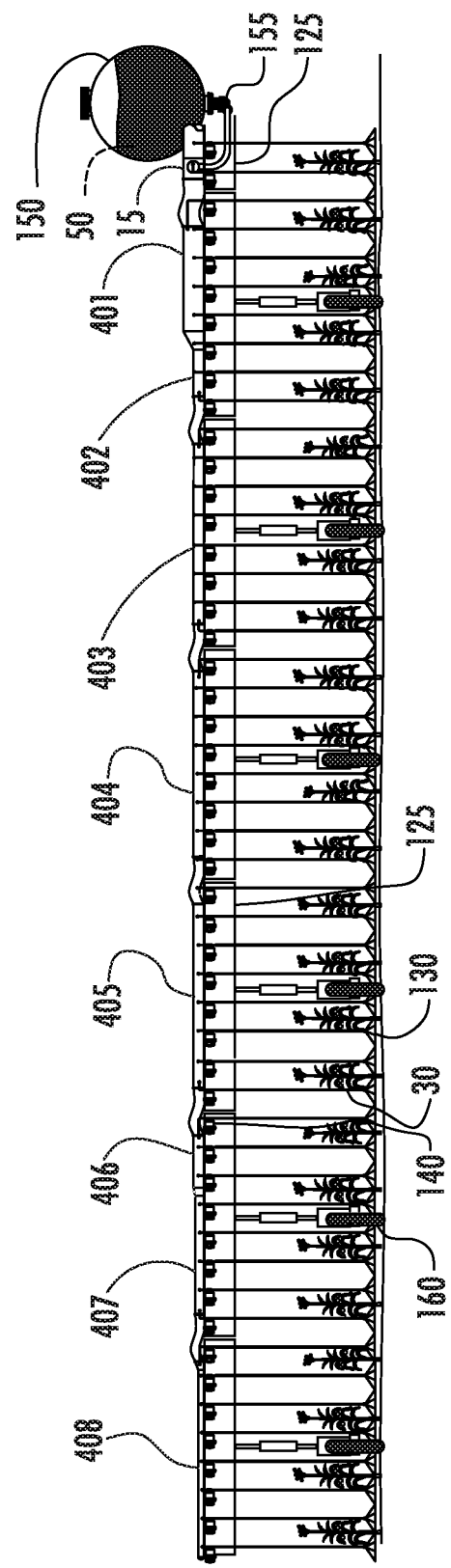

SYSTEM, APPARATUS AND METHOD FOR APPLYING UAN LIQUID FERTILIZER TO THE SOIL

CROSS-REFERENCE TO RELATED PATENT APPLICATION

This patent application claims the benefit of U.S. Provisional Patent Application No. 62/459,479, Feb. 15, 2017, the entire teachings and disclosure of which are incorporated herein by reference thereto.

FIELD OF THE INVENTION

It is generally known to add anhydrous ammonia ($NH_3$) to farmland soil to increase crop yields owing to its high 82% available nitrogen. However, in recent years there has been a move away from directly applying ammonia in favor of an alternate fluid, urea ammonium nitrate (UAN), for safety considerations, despite its lower nitrogen content. Ammonia is listed as a toxic substance as defined under OSHA 29 CFR1910.119, whereas UAN is listed under OSHA 1910.1200 as a hazardous substance. It is therefore a far less dangerous fluid to handle. UAN is a colorless liquid, having a slight ammonia smell due to a small quantity of free ammonia added by some sources of supply. UAN is comprised of varying quantities of ammonium nitrate, urea and water, depending upon designed nitrogen content. Its specific gravity is 1.32 at 60° F. (15.5° C.). The available nitrogen content solutions of UAN are 28%, 30% and 32%. UAN32, also known as 32-0-0, is comprised of a mixture of 45% by weight ammonium nitrate, 35% urea, and 20% water. Since ammonium nitrate is a solid under normal pressures, it dissolves in the water and urea mixture but will begin to precipitate at fluid temperatures less than 28.4° F. (−2° C.). It is therefore necessary to incorporate a means of agitation of UAN whenever a farmer plans to apply this fluid during cold weather.

Ammonia liquid has a −28° F. (−33° C.) normal boiling point temperature, and therefore must be handled under pressure when the surrounding temperature is warmer than −28° F. (−33° C.). At 32° F. (0° C.), ammonia is under 48 psig pressure. The normal boiling point temperature of UAN is 210° F., making it an easier fluid to handle, similar to water. It is slightly viscous, having an absolute viscosity of 5.5 centipoise, whereas the absolute viscosity of water at 60° F. (15.6° C.) is 1.0 centipoise. This viscosity, coupled with its higher specific gravity, increases the required pumping horsepower but this is not seen as a disadvantage in that positive displacement pumps coupled to hydraulic motors can easily meet the required pumping torque. Such hydraulic motors are in common use in the farming industry.

To those practitioners schooled in the art of piping system design, it may be recalled that the Darcy Equation is used for selecting appropriate tubing diameters when mass flows are known. It is also recalled that finding the value of the friction factor, f, becomes tantamount to predicting fluid head loss along any given tubing section. The friction factor becomes Reynolds dependent whenever fluid velocities drop below a certain threshold, namely less than $N_{re}$ 4000. This is when fluid viscosity rolls into the equation set. At Reynolds numbers greater than 4000, viscosity is no longer a factor, such as when UAN liquid fertilizer is flowing in a fully turbulent zone within a tube. The square law applies in that the force (pressure) required to move a fluid through a pipe of a known diameter varies to the square of a change in its velocity.

At fluid velocities between $N_{re}$ 2000 and 4000, accurate predictions of fluid movement versus UAN pump speed become unpredictable. At even lower velocities, $N_{re}$ less than 2000, tubing flow is laminar, therefore all previous equations used for finding the Reynolds Number become invalid. The result is uneven delivery of UAN liquid fertilizer to the soil. This explains why operators have needed to change out orifices when reducing tractor speeds to 4.5 miles per hour, one-fourth of the typical top tractor speed when applying this type of fertilizer. This argument also applies to existing UAN applicators which have rubber hoses arranged to feed sections comprised of multiple UAN sprayers.

Typically, UAN fluids are applied to a field by a UAN applicator pulled behind or under a tractor. The UAN applicator is fitted with a UAN sprayer distribution rail which may be comprised of sections of welded stainless steel tubing which supplies UAN fluid to a multiplicity of UAN control valves which supply UAN fluid to UAN sprayers spaced 15 inches or 20 inches apart. The UAN distribution rail is fed UAN fluid via the UAN pump, which may be located under a UAN atmospheric tank. The UAN atmospheric tank may be mounted atop the UAN pump so that gravity provides the needed force to move UAN fluid from the UAN atmospheric tank into the UAN pump. The UAN pump provides the required force to move UAN fluid through an outlet hose, then through a flow meter, then into the UAN sprayer distribution rail. The UAN distribution rail then feeds UAN fertilizing liquid to individual automatic shutoff valves and finally into the UAN sprayers.

The requirement for UAN fluid agitation during cold weather may be provided by a branch pipe connected to the UAN Pump outlet pipe. This branch pipe has an upstream pressure regulating valve that may be preset to bypass any UAN fluid in excess of the UAN fluid pressure required to meet adequate flow to each UAN sprayer. This bypass also provides an added element of safety in the event multiple automatic shutoff valves close simultaneously while fed from the positive displacement characteristics of the UAN pump.

Some known UAN sprayers have a multiplicity of rubber hoses that feed individual sections, said hoses being longer than necessary for sections nearest the pump. It is therefore necessary to loop these hoses backwards thus forming a jumble of rubber hoses each containing excess UAN fluid. To accurately measure flow and therefore apply the desired fertilization ratio per acre, a flow measuring device must provide accurate feedback to the rate controller device. There are several suitable turbine style flow meters on the market today, such as, for example, a Raven Precision RFM60S manufactured by Raven Industries, Inc. of Sioux Falls, S.Dak., USA or Sponsler Wafer Series Precision Turbine Flowmeters manufactured by Sponsler of Westminster, S.C. USA. However, this type of flow meter will only give accurate readings when the measured material is in a liquid state and of a uniform velocity across the flow meter diameter. A simultaneous mixture of air and liquid will cause turbine style flow meters to report erroneous application rates. As such, by their design capabilities, turbine style flow meters are sensitive to fluid velocity, but ignore mass density altogether. This becomes an advantage when pumping UAN fertilizing liquid in that UAN will not flash into vapor at atmospheric pressure which is an advantage over pumping liquid ammonia which does flash at low pressures.

Mass flow meters are very accurate at the upper end of typical gallon per minute application rates. However, when the application rate is at a low end of the spectrum, such as, for example, when the operator slows down to turn or navigate around an obstacle, the application rate dips below the operating range of commercially available mass flow meters.

UAN applicators require substantial reinforcement to support the weight of the laterally extending UAN sprayer distribution rails and accompanying frame. The weight of the frame itself is further increased by the weight of the hose or pipe which supplies UAN the length of the UAN sprayer distribution rails. With the weight of the sprayer boom possibly extending up 100 feet on either side of the sprayer vehicle, UAN applicators without support wheels must be highly reinforced, increasing the amount of materials required to produce the agricultural sprayer and thereby increasing the price.

UAN applicators known in the art often use distribution manifolds to shut off or allow flow through the distribution manifold to attached sprayer nozzles. Control of each distribution manifold is desirable so that the driver can selectivelyprovide UAN to the desired locations. Individual manifolds may be shut off to prevent overspray onto adjacent properties, terrain where crops are not planted, and other locations where application of UAN is not desired. When closed, the distribution manifold will inhibit flow through each of the attached sprayer nozzles, thereby limiting UAN application to only the engaged distribution manifolds and sprayer nozzles. However, selective control over individual manifolds has the downside that each sprayer nozzle cannot be controlled individually, and that multiple sprayer nozzles are turned on or off in unison with the sprayer nozzles attached to the same distribution manifold.

Embodiments of the invention provide a system, apparatus, and method for application of UAN. This and other advantages of embodiments of the invention, as well as additional inventive features, will be apparent from the description of the embodiments of the invention provided herein.

BRIEF SUMMARY OF THE INVENTION

In one aspect, embodiments of the present invention relate to a system, an apparatus and a method for applying liquid UAN fertilizer through a UAN sprayer distribution rail to supply an equal amount of UAN liquid fertilizer to each injection location. The use of welded stainless steel tubing and fittings allow UAN liquid fertilizer to be pumped through the UAN sprayer distribution rail while experiencing the lowest attainable coefficient of sidewall friction compared to other materials commonly used in this application. A further embodiment of the UAN sprayer distribution rail invention, being comprised of a straight section of varying diameter tubing, will have a lower internal volume of trapped UAN liquid fertilizer than a Hagie with its multiplicity of equal length rubber hoses. Use of eccentric reducers facilitates complete drainage of the UAN Sprayer Distribution Rail.

Another aspect of embodiments of the present invention is being able to simultaneously fertilize a 120 foot wide strip of farmland, made possible by the unique design of the UAN sprayer distribution rail. At 18 miles per hour with an application rate equal to 84 gallons of UAN liquid fertilizer per acre, a single acre can be fertilized in 13.75 seconds. A typical 120 foot wide strip may have 95 UAN spray nozzles, each flowing at the rate of 3.82 gpm, plus an additional 2 UAN spray nozzles flowing at one-half of this quantity, 1.91 gpm. The two lower flow UAN spray nozzles may be located at opposite ends of the UAN distribution rail, thus affording an operator to align the tractor so that the outer-most 15 inch wide strips are passed over twice.

Yet another aspect of embodiments of the present invention is being able to dramatically reduce the total combined length of fluid handling stainless steel tubing and flexible hoses compared with sprayers known in the art. Previous designs rely on the principle of equal friction between sections, therefore all rubber hoses must of equal lengths. That being said, hoses supplying UAN liquid to sections nearest the center are longer than necessary and this extra hose length must be looped and tied up.

The combination of using stainless steel tubing with a lower coefficient of side wall friction than rubber hoses, affords shortening the distance the UAN liquid may travel in the UAN sprayer distribution rail. This may significantly reduce resistance to flow and the overall pressure drop throughout the UAN sprayer distribution rail.

Embodiments of the present invention may not require manual adjustment to change the desired application rate. Instead, the system may remain pressured by virtue of the high pressure drop across the series combination of an automatic shutoff valve, flexible hose and UAN nozzle. The operator may be able to change the desired application rate using a display in conjunction with a rate controller.

The pump may be volume sensitive and may supply the exact quantity of UAN liquid fertilizer plus for bypassing a prescribed quantity of UAN liquid fertilizer relative to both speed and fertilizer application ratio. A pressure sensitive liquid return valve may maintain delivery pressure by continuously returning a preset quantity of UAN liquid fertilizer to the inlet of a pressure-sensitive regulating valve. The outlet of said pressure-sensitive regulating valve may be connected to the suction of the UAN pump for purposes of UAN liquid fertilizer agitation during cold weather.

It is, therefore, an advantage of embodiments of the present invention to provide a system, an apparatus and a method for applying nitrogen in concentrations of 28%, 30% or 32% to the soil.

Another advantage of embodiments of the present invention is to provide a system, an apparatus and a method for precisely applying UAN liquid fertilizer to the soil on farmland to increase crop yields.

Moreover, an advantage of embodiments of the present invention is to provide a system, an apparatus and a method for applying UAN liquid fertilizer to the soil which may reduce the amount of excess nitrogen that may be released onto crops during operation.

Moreover, another advantage of embodiments of the present invention is to provide a system, an apparatus and a method for applying UAN liquid fertilizer to the soil which may enable a pump to increase, decrease or maintain a steady pressure throughout an entire UAN sprayer distribution rail delivery system without a need for an engineered orifice.

Another advantage of embodiments of the present invention is to provide a system, an apparatus and a method for applying UAN liquid fertilizer to the soil without manually changing an orifice each time there may be a change in the desired application rate.

Still further, an advantage of embodiments of the present invention is to provide a system, an apparatus and a method for applying UAN liquid fertilizer to the soil without manual readjustment to change the desired application rate.

Also, an advantage of embodiments of the present invention is to provide a system, an apparatus and a method for applying UAN liquid fertilizer to the soil which may have identical fluid pressure reducing means at each UAN spray nozzle for uniform delivery of UAN liquid fertilizer.

An additional advantage of embodiments of the present invention is to provide a system, an apparatus and a method for applying UAN liquid fertilizer to the soil in which the employment of eccentric reducers at each change of diameter of the UAN sprayer distribution rail permit complete drainage of the UAN sprayer distribution rail.

A further advantage of embodiments of the present invention is to provide a system, an apparatus and a method for applying UAN liquid fertilizer to the soil which may maintain liquid pressure by using a liquid return valve controlled from differential pressure continuously reset from a programmable logic controller ("PLC").

Another advantage of embodiments of the present invention is to provide a system, an apparatus and a method for applying UAN liquid fertilizer to the soil which is relatively unaffected by changes in tractor speed while continuing to maintain UAN liquid fertilizer application uniformity.

In one aspect, an embodiment of the invention provides an apparatus for applying a liquid to soil. The apparatus includes a foldable distribution rail for receiving and outletting a flow of the liquid. The foldable distribution rail is comprised of a plurality of stainless steel sections and has a decreasing inner diameter from an inlet of the distribution rail to a distal end of the distribution rail.

In another aspect, an embodiment of the invention provides a system for supplying a liquid to the soil. The system includes a movable applicator having a frame carrying an atmospheric tank for supplying the liquid, a pump, a pressure regulating valve, a turbine style flow meter, a foldable distribution rail including a plurality of stainless steel sections. The foldable distribution rail has a decreasing inner diameter from an inlet of the distribution rail to a distal end of the distribution rail. The frame further carries a plurality of control valves downstream of the distributor rail, a plurality of distributor pipes downstream of the plurality of control valves and a plurality of nozzles downstream of the plurality of distributor pipes. The atmospheric tank, the pump, the pressure regulating valve, the distributor rail, the plurality of control valves, the plurality of distributor pipes and the plurality of nozzles are fluidly connected. The plurality of control valves located between the distributor rail and the plurality of nozzles.

In an embodiment, a plurality of control valves are downstream of the foldable distribution rail. A plurality of distributor pipes are downstream of the plurality of control valves. A plurality of spray nozzles are downstream of the plurality of distributor pipes. Each respective one of the plurality of control valves is fluidly connected in series to a respective one of the plurality of distributor pipes. Each respective one of the plurality of distributor pipes is fluidly connected in series with a respective one of the plurality of spray nozzles.

In an embodiment, each one of the plurality of distributor pipes is stainless steel.

In an embodiment, each one of the plurality of stainless steel sections is separated by and fluidly connected to an eccentric reducer.

In in embodiment, each one of the plurality of stainless steel sections is separated by and fluidly connected to a rubber joint.

In an embodiment, a pump for receives a supply of the liquid and outlets the flow of the liquid. The pump, a pressure regulating valve, and turbine style flow meter are fluidly connected and located upstream of the foldable distribution rail.

In an embodiment, the pressure regulating valve comprises a controllable pressure differential set point to assist in regulating the flow rate of the liquid.

In an embodiment, an outlet of the pressure regulating valve is fluidly connected to the supply of the Ammonium Nitrate to agitate the supply.

In an embodiment, a controller receives information from a GPS receiver, the turbine style flow meter and the speed of the pump and automatically adjusts the speed of the pump, the differential set point, and each one of the plurality of control valves to control the flow rate to each one of the plurality of nozzles.

In an embodiment, an operator of the apparatus may view the flow rate through the plurality of nozzles from a secondary display and can automatically adjust the flow rate through the plurality of nozzles via the in-cab rate controller.

In an embodiment, the control valves are automatic shut off valves.

In an embodiment, outermost nozzles of the plurality of nozzles are sized to provide a flow rate half the flow rate of the remaining plurality of nozzles.

In an embodiment, each one of the plurality of control valves is either on or off.

In an embodiment, each one of the plurality of control valves is configured to be controlled on, off, and an amount therebetween to provide a unique flow rate through its respective one of the plurality of spray nozzles such that the unique flow rate may be the same as or different than any other one of the unique flow rates through each one of the plurality of spray nozzles.

In an embodiment, the liquid is Ammonium Nitrate.

In an embodiment, the controller receives information from a GPS receiver, the turbine style flow meter and the speed of the pump and automatically adjusts the speed of the pump, a differential set point of the pressure regulating valve, and each one of the plurality of control valves to control the flow rate to each one of the plurality of nozzles.

In an embodiment, each one of the plurality of distributor pipes is stainless steel.

In an embodiment, an outlet of the pressure regulating valve is fluidly connected to the atmospheric tank to agitate the supply of liquid when in use.

In yet another aspect, an embodiment of the invention provides a method for applying a liquid to soil. The method includes supplying a flow of liquid to a foldable distribution rail comprised of a plurality of stainless steel sections. The method includes receiving and outletting a flow of the liquid from the foldable distribution rail having a decreasing inner diameter from an inlet of the foldable distribution rail to distal ends of the foldable distribution rail. The method includes injecting fluid to the soil through a plurality of nozzles fluidly connected to the foldable distribution rail and controlling the flow rate of the liquid through the plurality of nozzles.

Other aspects, objectives and advantages of embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 6 illustrates a frontal view of a further embodiment of the present invention, similar to FIG. 3, showing an UAN sprayer distribution rail applicator with 8 pipe sections per half rail.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
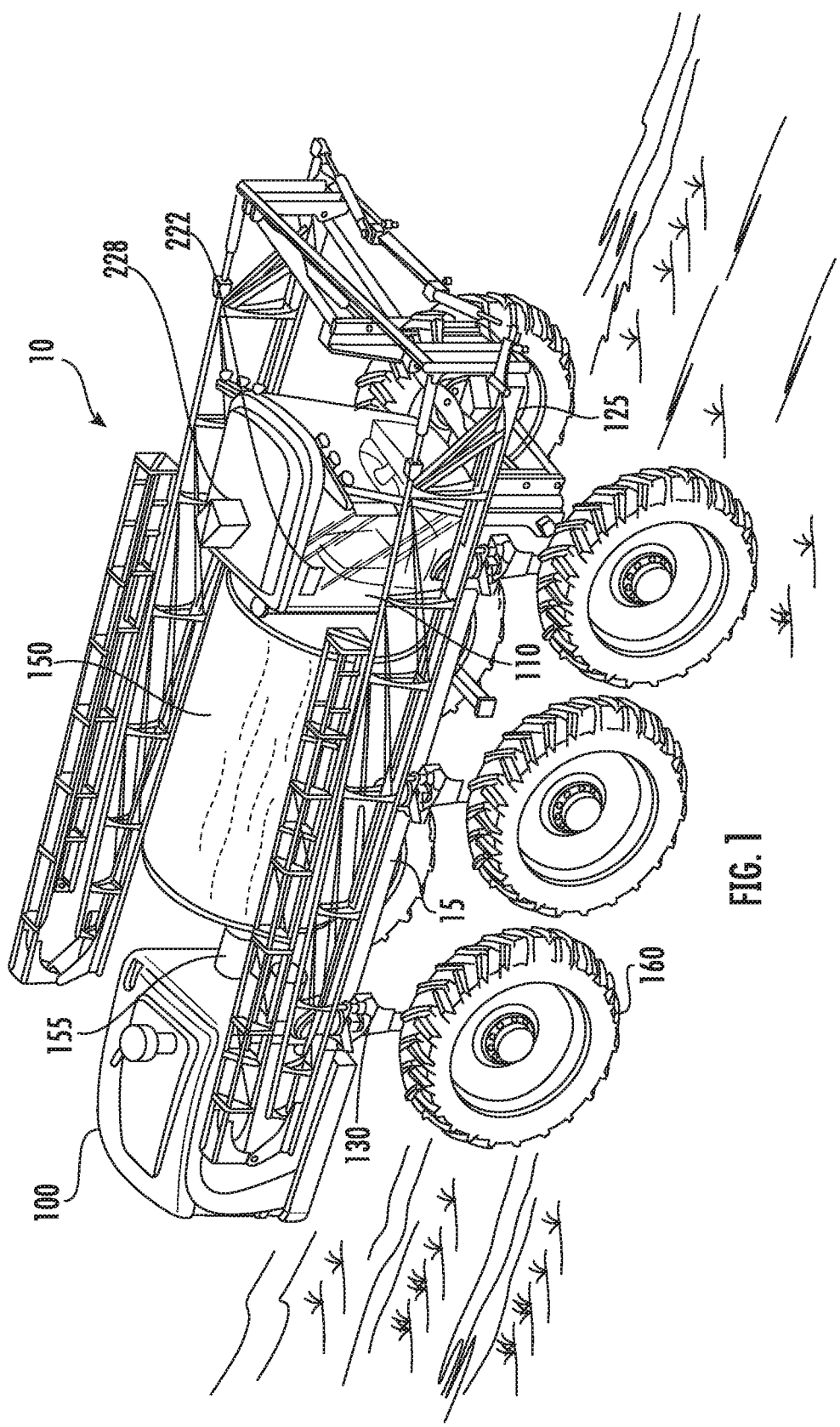
FIG. 1 illustrates an embodiment of the present invention having a UAN applicator with a UAN atmospheric tank, UAN pump, UAN sprayer distribution rail and fertilizing nozzle pulled by a tractor.

Referring to the drawings wherein like numerals represent like parts, FIG. 1 illustrates a system 10 in an embodiment of the present invention. The system 10 may be pulled or carried by a tractor, a truck and/or the like. In a first embodiment, the system 10 has a tractor 100 supporting a UAN sprayer distribution rail applicator 15. The system 10 has a UAN atmospheric tank 150 connected to a UAN pump 155 with a UAN sprayer distribution rail applicator frame 125 which may be supported upon a plurality of wheels 160. In this embodiment, the UAN sprayer distribution rail applicator 125 is shown without wheels. Other embodiments may or may not use wheels 160 to support the UAN sprayer distribution applicator 125 (see FIG. 3). The UAN sprayer distribution rail is further shown in a folded configuration relative to the tractor 100. A plurality of UAN spray nozzles 130 may be connected to the UAN sprayer distribution rail applicator 15. The system 10 is shown with an in-cab rate controller interface 110, a second display 222, and a GPS receiver 228.

Figure 2:
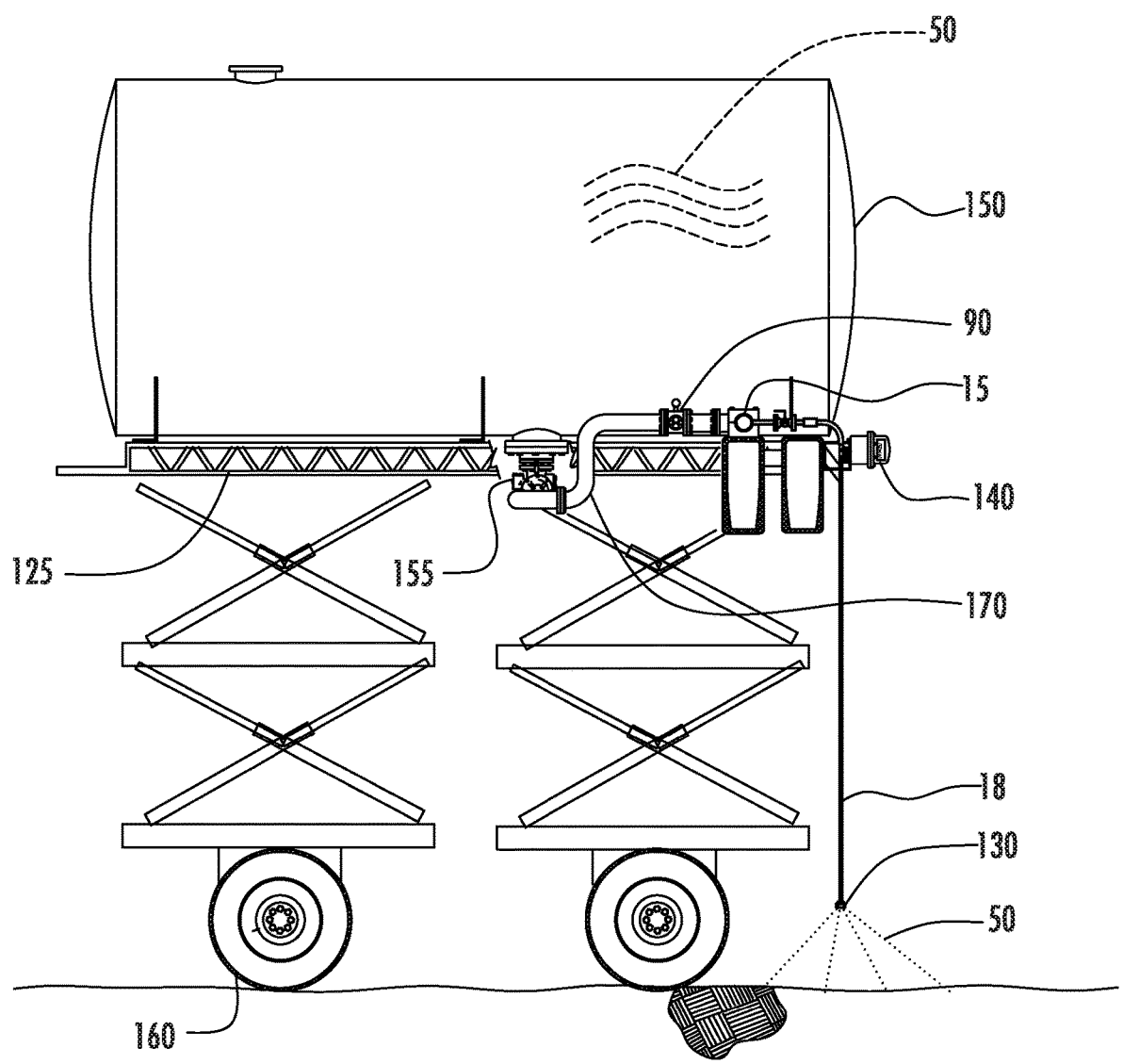
FIG. 2 illustrates a side elevation view of a UAN sprayer distribution rail applicator in a further embodiment of the present invention.

Referring to FIG. 2, a UAN atmospheric tank 150 may be mounted above a UAN pump 155 and UAN sprayer distribution rail applicator frame 125 which may be supported by a plurality of wheels 160. The UAN atmospheric tank 150 may feed UAN fertilizing liquid 50 into the UAN pump 155 which may supply UAN fertilizing liquid 50 through a flexible hose 170 to a turbine style flow meter 90 and from there the UAN fertilizing liquid 50 may enter a UAN sprayer distribution rail applicator 15 which may be secured to the UAN sprayer distribution rail applicator frame 125. The UAN fertilizing liquid may then enter a plurality of UAN liquid fertilizer automatic shut-off valves 140 and enter a distributor pipe 18 connected to a plurality of UAN spray nozzles 130.

Figure 3:
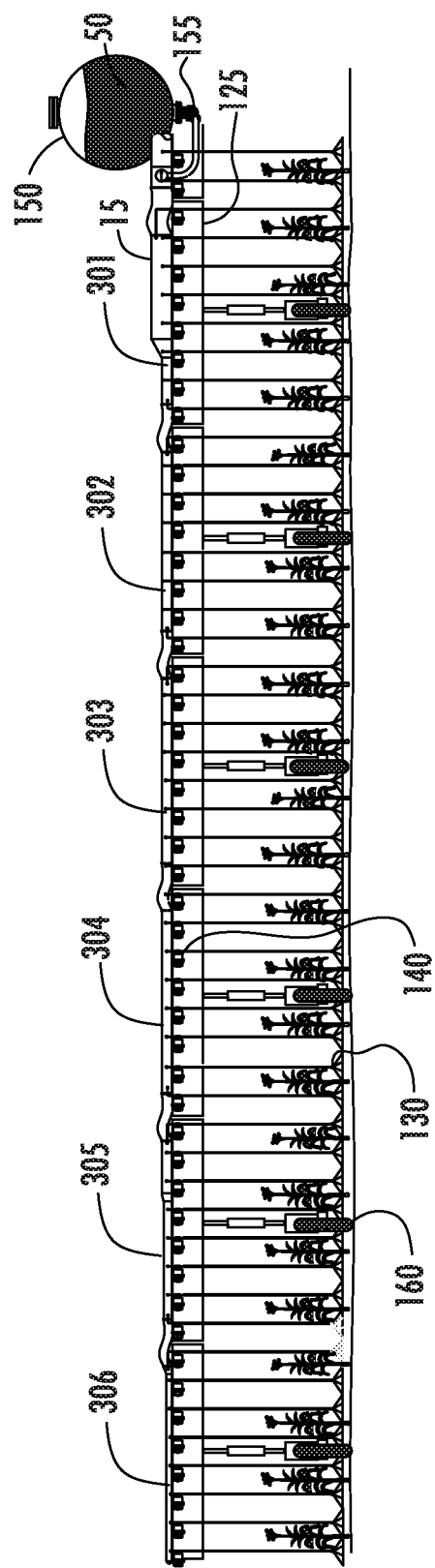
FIG. 3 illustrates a frontal view of the of the UAN sprayer distribution rail applicator, UAN sprayer distribution rail applicator frame and UAN atmospheric tank all being supported upon a plurality of wheels in an embodiment of the present invention.

Referring to FIG. 3, a UAN atmospheric tank 150 may be supported upon a sectionalized, movable UAN sprayer distribution rail applicator frame 125. This embodiment shows the UAN sprayer distribution rail applicator frame 125 in an extended position supported by a plurality of wheels 160. A UAN pump 155 may be mounted to the bottom of the UAN atmospheric tank 150. UAN pump 155 forces UAN fertilizing liquid 50 into a UAN sprayer distribution rail applicator 15 which is supported from the UAN sprayer distribution rail applicator frame 125. The UAN sprayer distribution rail applicator frame 125 rests upon a plurality of wheels 160, enabling said sectionalized movable frame to be moved across a farm field for purposes of soil nitrogen enrichment to increase crop production. A plurality of UAN spray nozzles 130 may be connected to the UAN distribution rail applicator 15. Flow of UAN fertilizing liquid 50 through each UAN spray nozzle 130 may be controlled by a respective UAN liquid fertilizer automatic shut-off valve 140. Control of said UAN liquid fertilizing automatic shut-off valve 140 may be accomplished by a signal carried by UAN applicator wiring 236 from the in-cab rate controller interface 110 (see FIG. 5).

The UAN sprayer distribution rail applicator 15 and frame may be formed of multiple spraying sections. A spraying section is defined as simultaneous control of multiple UAN liquid fertilizer automatic shut-off valves 140. The UAN sprayer distribution rail applicator 15 may be formed by a first spray section 301, a second spray section 302, a third spray section 303, a fourth spray section 304, a fifth spray section 305 and/or a sixth spray section 306 (collectively, hereafter referred to as "the spray sections 301-306"). The first spray section 301, the second spray section 302, the third spray section 303, the fourth spray section 304, the fifth spray section 305 and/or the sixth spray section 306 may have a first channel radius, a second channel radius, a third channel radius, a fourth channel radius, a fifth channel radius and/or a sixth channel radius (collectively, hereafter referred to as "the radiuses or radii"), respectively. The first channel radius may be larger than the second radius, the second channel radius may be larger than the third radius, the third channel radius may be larger than the fourth radius, the fourth channel radius may be larger than the fifth radius and/or the fifth channel radius may be larger than the sixth channel radius.

Figure 4:
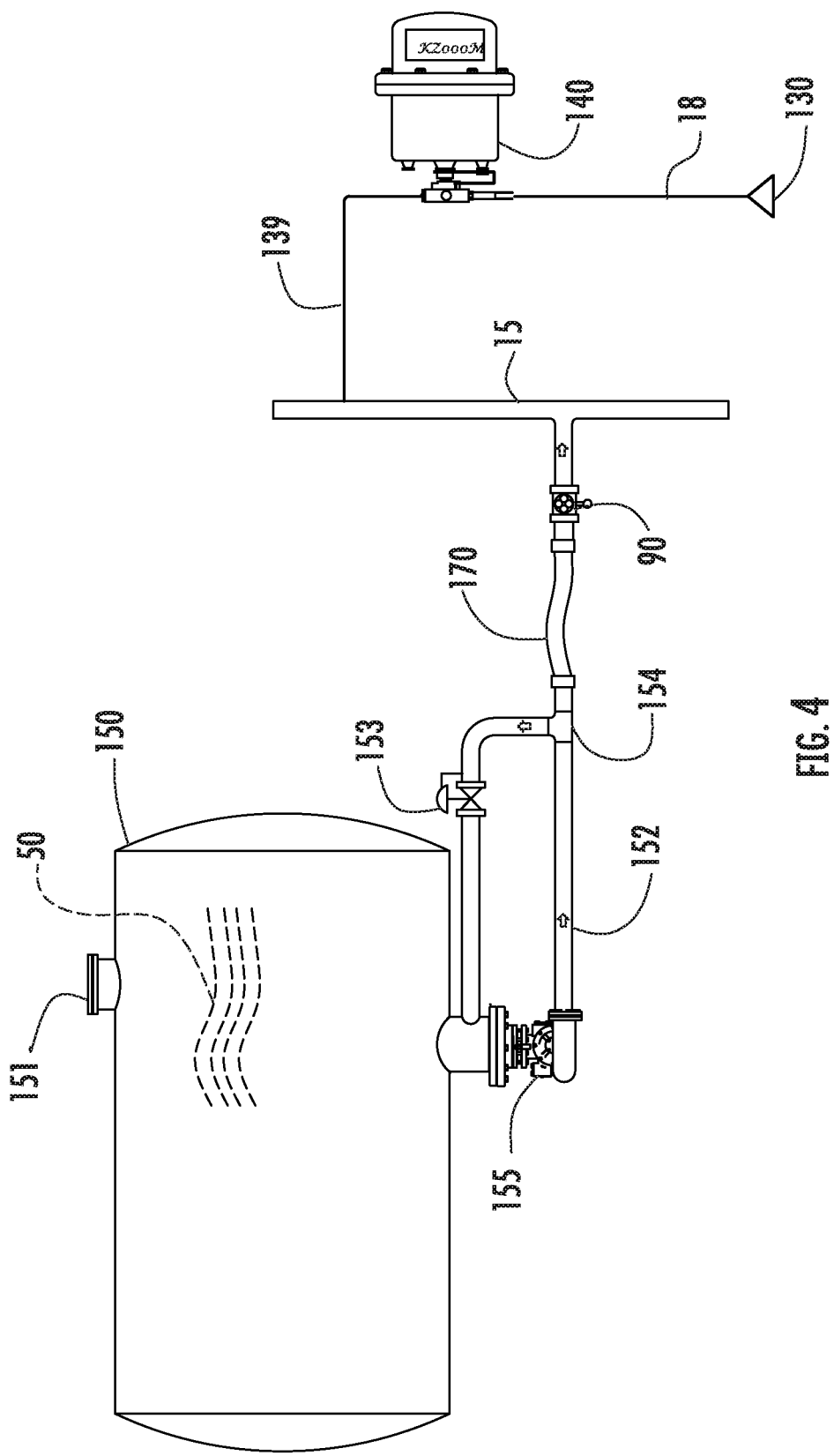
FIG. 4 illustrates a UAN fertilizing liquid flow diagram in an embodiment of the present invention.

Referring to FIG. 4, beginning at the source of the UAN fertilizing liquid 50, the UAN atmospheric tank 150 may rest upon the UAN pump 155. As UAN fertilizing liquid 50 is withdrawn from the UAN atmospheric tank 150, air may be admitted through an atmospheric tank air vent 151 in order to prevent a vacuum from forming within the UAN atmospheric tank 150. UAN fertilizing liquid 50 exits the UAN pump 155 and enters an outlet pipe 152. The outlet pipe 152 may be connected to a tee 154. The bull of the tee 154 may be connected to a pressure regulating valve 153. The outlet of pressure regulating valve 153 may be connected to a large outlet at the bottom of the UAN atmospheric tank 150. The purpose of this connection may be to agitate the UAN fertilizing liquid 50 as well as to provide a means of first order safety relief if all of the UAN liquid fertilizer automatic shut-off valves 140 become closed simultaneously because the UAN pump 155 is a positive-displacement type pump. The run from tee 154 may be connected to a flexible hose 170 which then may be connected to a turbine style flow meter 90. Other types of flow meters may also be used. The outlet of the flexible hose 170 may be connected to the UAN sprayer distribution rail applicator 15. The UAN sprayer distribution rail applicator 15 may be connected to a multiplicity of distributor outlet pipes 139. Each distributor outlet pipe 139 may be connected to a UAN liquid fertilizer automatic shut-off valve 140 which may be connected to a distributor pipe 18. Each distributor pipe may then be connected to a UAN spray nozzle 130.

Figure 5:
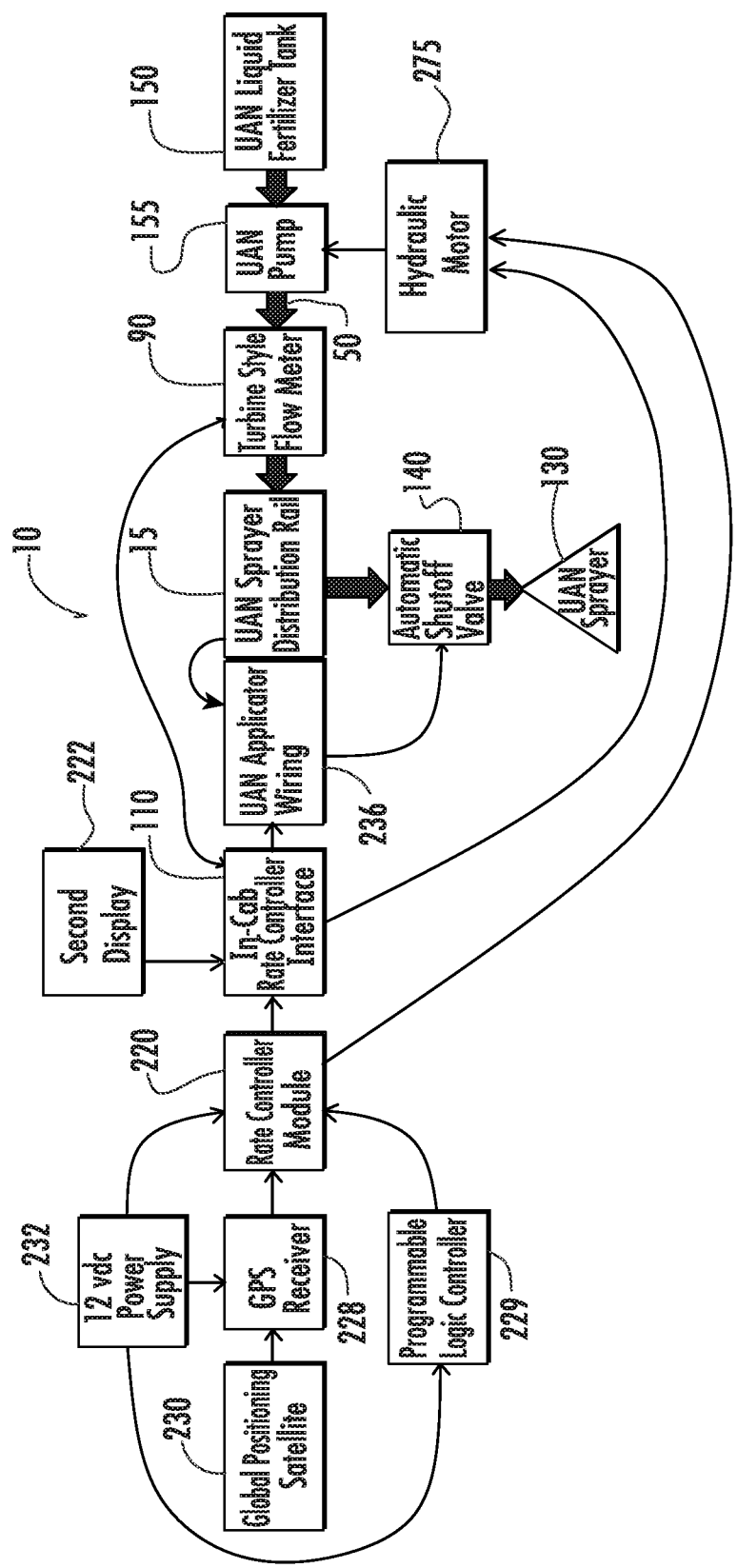
FIG. 5 illustrates a block control diagram of the system as in an embodiment of the present invention.

Referring to FIG. 5, a block control diagram of System 10 may be described in detail. The large shaded arrows depict the flow of UAN fertilizing liquid 50 from UAN atmospheric tank 150 to UAN pump 155 then through turbine style flow meter 90, then through UAN sprayer distribution rail 15, then through a multiplicity of UAN liquid fertilizer automatic shut-off valves 140 which may be in series with UAN spray nozzles 130.

The small arrows in FIG. 5 depict input/output channels between the various control components described as follows. The UAN pump 155 may be driven by a hydraulic motor 275 which receives its signal from an in-cab rate controller interface 110. The turbine style flow meter 90 may sense the flow of UAN fertilizing liquid 50 and may electronically signal the in-cab rate controller interface 110, which may be located in the tractor 100 (see FIG. 1), and the programmable logic controller 229.

The in-cab rate controller interface 110 may receive and display information concerning the rate of application of the UAN fertilizing liquid 50 per acre. A second display 222 may show the present flow rate sensed by the turbine style flow meter 90 so that the operator of the tractor 100 may monitor and may compare the two values and modify the UAN fertilizing liquid 50 ratio prescription using the in-cab rate controller interface 110. The GPS receiver 228 receives information from a global positioning satellite 230 and provides information to a rate controller module 220 and the in-cab rate controller interface 110. Power is provided to the system 10 by a 12 volt dc power supply 232.

The tractor operator may be able to shut off the flow of UAN fertilizing liquid 50 to the UAN sprayer distribution rail applicator 15 in the event of a malfunction with the in-cab rate controller interface 110. The flow of UAN fertilizing liquid 50 can be divided into equal halves by connecting to the center of the UAN sprayer distribution rail applicator 15.

Optimum UAN fertilizing liquid 50 flows to each UAN spray nozzle 130, spaced at either 15 inches or 20 inches in certain embodiments, may be predicted using the speed of the tractor 100 from a GPS receiver 228 on the tractor (see FIG. 1) and the UAN fertilizing liquid 50 application ratio per acre. As an example, consider an application ratio equal to 84 gallons per acre, a fertilized width equal to 120 feet and a tractor speed equal to 18 miles per hour. Knowing that an acre is equal to 43,650 square feet, the distance traveled becomes 363 feet per acre and the time to fertilize one acre becomes 363 feet divided by 1,584 feet per minute or 13.75 seconds. Therefore, the application flow rate becomes 84 gallons per acre divided by 13.75 seconds or 366.5 GPM total. The rate per nozzle then becomes 3.82 GPM per nozzle, assuming flow is divided equally between 96 nozzles of equal flow rate.

It is common industry practice for the two outer-most UAN liquid fertilizer spray nozzles to receive one-half the flow rate of the remaining nozzles connected to the UAN sprayer distribution rail applicator 15. In this arrangement, an operator will double back and align the UAN sprayer distribution rail applicator 15 such that the two outer-most rows may be passed over twice, thus receiving the correct fertilizing liquid quantity. Verification of the correct UAN fertilizing liquid 50 may be continuously monitored by the turbine style flow meter 90.

In an alternate embodiment shown in FIG. 6, has eight sections per half rail, the pipe diameter may vary by pipe section from, e.g., three and one-half inches, to three inches to two and one half inches, to two inches, to one and one half inches, to one and one quarter inches, to one inch, to three quarters inch as shown in FIG. 6.

These pipe sections may be separated by the inclusion of an eccentric reducer (not shown) between each pipe section, known collectively as pipe sections 401 through 408. The UAN sprayer distribution rail described herein may be comprised of a straight run of stainless steel tubing having eccentric reducers (not shown) between each section which facilitate complete drainage and may have rubber joints between each section to allow for folding of the distribution rail 15. Use of a stainless steel UAN sprayer distribution rail applicator 15 with a decreasing radius and elimination of equal length rubber hoses, necessary for systems known in the art, allows for the elimination of additional reinforcement to UAN Sprayer distribution rail applicator frame 125. Reinforcement requires additional, unnecessary materials and is typically needed to support the weight of the hoses used in UAN Sprayers known in the art and UAN contained within.

Referring once again to FIG. 3, the UAN sprayer distribution rail applicator 15 and/or one or more of the spray sections 301-306 may be made from stainless steel. The stainless steel may decrease side wall friction between the UAN fertilizing liquid 50 and/or the UAN sprayer distribution rail applicator 15 and/or the one or more of the spray sections 301-306. The spray sections 301-306 may be manufactured integrally with each other such that the tube 30 (see FIG. 6) may be manufactured as one piece. Alternatively, the spray sections 301-306 may be attached to each other to form the UAN sprayer distribution rail applicator 15. The UAN Sprayer distribution rail applicator 15 may be formed by any number of the spray sections 301-306, and the present invention is not limited to a specific number of the spray sections 301-306. The present invention is not limited to a specific embodiment of the UAN Sprayer distribution rail applicator 15, the spray sections 301-306 or the pipe diameter.

As shown in FIG. 5, the plurality of UAN liquid fertilizer automatic shut-off valves 140 may be connected to the UAN sprayer distribution rail applicator 15 and may adjust the flow of UAN fertilizing liquid 50 based on signals generated by the programmable logic controller 229. The turbine style flow meter 90 may also be pressure transducers, mass flow meters and/or the like. Moreover, the programmable logic controller 229 may adjust the flow of UAN fertilizing liquid 50 to each UAN spray nozzle 130 based on GPS information received from the GPS receiver 228, a per-acre fertilizing ratio from a rate controller module 220, the in-cab rate controller interface 110 and signals from the turbine style flow meter 90.

Other forms of row and/or section control may be achieved within the scope of the invention by utilizing a solenoid valve (not shown) in the place of the UAN liquid fertilizer automatic shut-off valves 140. Thus, the UAN sprayer distribution rail applicator 15 may route UAN fertilizing liquid 50 to each UAN spray nozzle 130. When the flow of UAN fertilizing liquid 50 is shut off to the individual UAN spray nozzles 130 connected to the UAN sprayer distribution rail applicator 15, approximately three feet of plastic tubing, which has a small internal diameter, may hold less than one quart of UAN fertilizing liquid 50. This small amount of UAN fertilizing liquid 50 is not seen as being delirious to crops or creating an inhalation or skin contact hazard for the operator, unlike application of anhydrous ammonia.

Embodiments of the present invention is further rooted in a basic hydraulic principle that states that uniform fluid flow may be established when all individual UAN liquid fertilizer spray nozzles are identical and have equal flow rates. Each UAN liquid fertilizer spray nozzle may be in series with its respective automatic shutoff valve. Furthermore, the hydraulic pressure drop across each UAN spray nozzle and companion automatic shutoff valve can be selected for a high Reynolds Number contributing to nearly all of the total UAN pump dynamic head. To accomplish this embodiment, each UAN liquid fertilizer branch outlet may be selected for a high Reynolds Number, around 350,000 with an upper limit equal to 80 psi pressure loss to atmospheric pressure.

This permits a 25% speed reduction without suffering the aforementioned changes in fluid hydraulic friction factors because nearly all of the total UAN pump hydraulic pressure lift occurs at each point of delivery and is therefore relatively unaffected by changes in UAN fertilizing liquid velocity and Reynolds Number computations within the UAN Distribution rail.

Regarding the lower nitrogen content of UAN fluids as compared to anhydrous ammonia, it is necessary to apply a greater quantity of UAN versus applying anhydrous ammonia to achieve equal nitrogen fertilization over a given acre of land. Therefore, the application means described herein must be designed for delivering a higher flow rate than that needed for applying ammonia. Not only will UAN handling pumps be larger, the required tubing diameters to evenly distribute UAN over each row of corn crop will likewise be larger as well. The number of injection points over a given application bar width become greater. For example, the distance between ammonia injection points is equal to the distance between rows of corn, 30 inches. When applying UAN, this distance drops to historically 20 inches or more recently, 15 inches.

The embodiments described herein provides advantage over prior systems and methods, at least in part, because the combination of a UAN spray nozzle 130 in series with a UAN liquid fertilizer automatic shut-off valve 140 may comprise a significant portion of the total discharge head that the UAN pump 155 develops.

Moreover, the present invention is not limited to the specific arrangement of the components illustrated in the figures. It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for applying a liquid to soil; the apparatus comprising:
   a foldable distribution rail;
   wherein the foldable distribution rail consists essentially of a plurality of stainless steel sections and has a decreasing inner diameter from an inlet of the distribution rail to a distal end of the distribution rail.

2. The apparatus of claim 1, further comprising:
   a plurality of control valves downstream of the foldable distribution rail;
   a plurality of distributor pipes downstream of the plurality of control valves;
   a plurality of spray nozzles downstream of the plurality of distributor pipes;
   wherein each respective one of the plurality of control valves is fluidly connected in series to a respective one of the plurality of distributor pipes and each respective one of the plurality of distributor pipes is fluidly connected in series with a respective one of the plurality of spray nozzles.

3. The apparatus of claim 2, wherein each one of the plurality of distributor pipes is stainless steel.

4. The apparatus of claim 2, wherein each one of the plurality of stainless steel sections is separated by and fluidly connected to an eccentric reducer.

5. The apparatus of claim 2, wherein each one of the plurality of stainless steel sections is separated by and fluidly connected to a rubber joint.

6. The apparatus of claim 5, further comprising:
   a pump for receiving a supply of the liquid and outletting the flow of the liquid;
   a pressure regulating valve;
   a turbine flow meter;
   wherein the pump, the pressure regulating valve, and turbine style flow meter are fluidly connected and located upstream of the foldable distribution rail.

7. The apparatus of claim 6, wherein the pressure regulating valve comprises a controllable pressure differential set point to assist in regulating the flow rate of the liquid.

8. The apparatus of claim 7, wherein a controller receives information from a GPS receiver, the turbine flow meter and a speed of the pump and automatically adjusts the speed of the pump, the differential set point, and each one of the plurality of control valves to control the flow rate to each one of the plurality of nozzles.

9. The apparatus of claim 8, wherein an operator of the apparatus may view a flow rate through the plurality of nozzles from a secondary display and can automatically adjust the flow rate through the plurality of nozzles via an in-cab rate controller.

10. The apparatus of claim 9, wherein the control valves are automatic shut off valves.

11. The apparatus of claim 10, wherein outermost nozzles of the plurality of nozzles are sized to provide the flow rate at half the flow rate of the remaining plurality of nozzles.

12. The apparatus of claim 11, wherein each one of the plurality of control valves is either on or off.

13. The apparatus of claim 9, wherein each one of the plurality of control valves is configured to be controlled on, off, and an amount therebetween to provide the flow rate at a unique flow rate through its respective one of the plurality of spray nozzles such that the unique flow rate may be the same as or different than any other one of the unique flow rates through each one of the plurality of spray nozzles.

14. The apparatus of claim 6, wherein an outlet of the pressure regulating valve is fluidly connected to the supply of the liquid to agitate the supply.

15. The apparatus of claim 1, wherein the liquid is Ammonium Nitrate.

16. A system for supplying a liquid to the soil; the system comprising:
   a movable applicator having a frame carrying:
     an atmospheric tank for supplying the liquid;
     a pump;
     a pressure regulating valve;
     a turbine flow meter;
     a foldable distribution rail consists essentially of a plurality of stainless steel sections, the foldable distribution rail having a decreasing inner diameter from an inlet of the distribution rail to a distal end of the distribution rail;
     a plurality of control valves downstream of the distributor rail;
     a plurality of distributor pipes downstream of the plurality of control valves;
     a plurality of nozzles downstream of the plurality of distributor pipes;
     wherein the atmospheric tank, the pump, the pressure regulating valve, the distributor rail, the plurality of control valves, the plurality of distributor pipes and the plurality of nozzles are fluidly connected, the plurality of control valves located between the distributor rail and the plurality of nozzles.

17. The system of claim 16, further comprising a controller, wherein the controller receives information from a GPS receiver, the turbine flow meter and a speed of the pump and automatically adjusts the speed of the pump, a differential set point of the pressure regulating valve, and each one of the plurality of control valves to control a flow rate to each one of the plurality of nozzles.

18. The system of claim 16, wherein each one of the plurality of distributor pipes is stainless steel.

19. The system of claim 18, wherein an outlet of the pressure regulating valve is fluidly connected to the atmospheric tank to agitate the supply of liquid when in use.

20. A method for applying a liquid to soil; the method comprising:
   supplying a flow of liquid to a foldable distribution rail consisting essentially of a plurality of stainless steel sections;
   receiving and outletting a flow of the liquid from the foldable distribution rail having a decreasing inner diameter from an inlet of the foldable distribution rail to distal ends of the foldable distribution rail;
   injecting fluid to the soil through a plurality of nozzles fluidly connected to the foldable distribution rail; and
   controlling the flow rate of the liquid through the plurality of nozzles.

* * * * *